(12) United States Patent
Rosati et al.

(10) Patent No.: US 11,294,372 B2
(45) Date of Patent: Apr. 5, 2022

(54) DRIVING MODE DECISION SUPPORT

(71) Applicant: INTERNATIONAL BUSINESS MACHINES CORPORATION, Armonk, NY (US)

(72) Inventors: Leonardo Rosati, Rome (IT); Alice Guidotti, Rome (IT); Fabio Cerri, Rome (IT); Roberto Ragusa, Rome (IT)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 308 days.

(21) Appl. No.: 16/277,151

(22) Filed: Feb. 15, 2019

(65) Prior Publication Data
US 2020/0264608 A1    Aug. 20, 2020

(51) Int. Cl.
| G05D 1/00 | (2006.01) |
| B60Q 9/00 | (2006.01) |
| B60R 16/037 | (2006.01) |
| B60W 50/08 | (2020.01) |
| B60W 50/14 | (2020.01) |
| G06N 5/04 | (2006.01) |

(52) U.S. Cl.
CPC ............ *G05D 1/0088* (2013.01); *B60Q 9/00* (2013.01); *B60R 16/0373* (2013.01); *B60W 50/085* (2013.01); *B60W 50/14* (2013.01); *G05D 1/0061* (2013.01); *G06N 5/045* (2013.01); *G05D 2201/0213* (2013.01)

(58) Field of Classification Search
CPC .............. G05D 1/0088; G05D 1/0061; G05D 2201/0213; B60R 16/0373; G06N 5/045; B60W 50/14; B60W 50/085; B60W 60/005; B60W 50/082; B60W 50/0097; B60W 2540/043; B60W 2540/30; B60W 2540/215
See application file for complete search history.

(56) References Cited

U.S. PATENT DOCUMENTS

| 8,527,199 | B1 | 9/2013 | Burnette et al. |
| 8,718,861 | B1 | 5/2014 | Montemerlo et al. |
| 9,189,897 | B1 | 11/2015 | Stenneth |
| 9,663,118 | B1* | 5/2017 | Palmer .................. B60K 28/06 |
| 9,688,288 | B1 | 6/2017 | Lathrop et al. |
| 9,836,973 | B2* | 12/2017 | Gordon .................. G08G 1/097 |
| 9,940,834 | B1 | 4/2018 | Konrardy et al. |
| 9,944,291 | B2* | 4/2018 | Gordon .................. B60W 40/04 |

(Continued)

*Primary Examiner* — Mussa A Shaawat
(74) *Attorney, Agent, or Firm* — Anthony Curro

(57) ABSTRACT

A driving mode decision support for a decision to select a driving mode of driving on at least one road segment is provided to a user of an autonomous vehicle. A driver driving profile of a user is received. Segment information defining the at least one road segment is queried. The segment information includes at least a model driver driving profile associated with the at least one road segment. A driving mode decision support for the user is determined for the at least one road segment based on the driver driving profile of the user and the model driver driving profile. An indication of the driving mode decision support is provided to the user. The driving mode decision support includes a recommended driving mode of driving on the at least one road segment.

19 Claims, 12 Drawing Sheets

(56) References Cited

U.S. PATENT DOCUMENTS

| | | | | |
|---|---|---|---|---|
| 11,034,361 B2* | 6/2021 | Boss | | G05D 1/0088 |
| 2009/0091435 A1* | 4/2009 | Bolourchi | | B60K 28/066 |
| | | | | 340/435 |
| 2010/0109908 A1* | 5/2010 | Miura | | G08G 1/096741 |
| | | | | 340/905 |
| 2014/0272810 A1* | 9/2014 | Fields | | G09B 9/052 |
| | | | | 434/65 |
| 2014/0303827 A1* | 10/2014 | Dolgov | | B60W 30/00 |
| | | | | 701/23 |
| 2014/0336935 A1 | 11/2014 | Zhu et al. | | |
| 2015/0149017 A1* | 5/2015 | Attard | | B60W 30/18163 |
| | | | | 701/23 |
| 2015/0175168 A1* | 6/2015 | Hoye | | G07C 5/00 |
| | | | | 434/64 |
| 2015/0266455 A1 | 9/2015 | Wilson | | |
| 2016/0026182 A1 | 1/2016 | Boroditsky et al. | | |
| 2016/0203560 A1* | 7/2016 | Parameshwaran | | |
| | | | | G06Q 30/0218 |
| | | | | 705/4 |
| 2016/0325779 A1* | 11/2016 | Zwicky | | B60W 30/09 |
| 2016/0362118 A1* | 12/2016 | Mollicone | | G05D 1/0276 |
| 2017/0305434 A1* | 10/2017 | Ratnasingam | | G06N 20/00 |
| 2017/0313323 A1* | 11/2017 | Tseng | | B60W 50/0098 |
| 2017/0349186 A1* | 12/2017 | Miller | | B60W 40/08 |
| 2017/0355377 A1* | 12/2017 | Vijaya Kumar | | B60W 40/08 |
| 2017/0368936 A1 | 12/2017 | Kojima | | |
| 2017/0370740 A1 | 12/2017 | Nagy et al. | | |
| 2018/0032072 A1* | 2/2018 | Hoye | | B60W 50/14 |
| 2018/0118219 A1* | 5/2018 | Hiei | | B60W 40/09 |
| 2018/0148071 A1* | 5/2018 | Kim | | A61B 5/18 |
| 2018/0186376 A1* | 7/2018 | Lee | | B60W 50/14 |
| 2018/0231974 A1* | 8/2018 | Eggert | | B60W 30/085 |
| 2019/0064800 A1* | 2/2019 | Frazzoli | | G05D 1/0223 |
| 2019/0064801 A1* | 2/2019 | Frazzoli | | G05D 1/0061 |
| 2019/0064802 A1* | 2/2019 | Frazzoli | | G05D 1/0088 |
| 2019/0064803 A1* | 2/2019 | Frazzoli | | G05D 1/0061 |
| 2019/0064804 A1* | 2/2019 | Frazzoli | | B60W 60/0011 |
| 2019/0064805 A1* | 2/2019 | Frazzoli | | G05D 1/0061 |
| 2019/0138003 A1* | 5/2019 | Ming | | G05D 1/0061 |
| 2019/0155281 A1* | 5/2019 | Hoye | | G05D 1/0061 |
| 2019/0186947 A1* | 6/2019 | Rockmore | | B60W 50/14 |
| 2019/0294167 A1* | 9/2019 | Kutila | | B60W 30/0956 |
| 2019/0337522 A1* | 11/2019 | Hong | | G06N 7/005 |
| 2020/0117190 A1* | 4/2020 | Schmitt | | A61B 5/0077 |

\* cited by examiner

DRIVING MODE DECISION SUPPORT

FIELD

Embodiments of the invention relate to vehicles that may be operated either autonomously or manually, and more specifically, to technology for providing driving mode decision support to a user of an autonomous vehicle.

BACKGROUND

Autonomously driving vehicles, e.g. cars on a public road, are a part of a rapidly maturing technology. It is to be expected that, in a near future, regulations and markets will allow people to own a car that can autonomously drive. At least some, if not all, autonomous vehicles will include a mode which allows the vehicle to be manually driven by the user.

SUMMARY

There is provided in accordance with the present invention a method for providing a driving mode decision support to a user for a decision to select a driving mode of driving on at least one road segment, the method comprising: receiving a user driver driving profile; querying segment information defining the at least one road segment, the segment information comprising at least a model driver driving profile associated with the at least one road segment; determining, for the at least one road segment, based on the user driver driving profile and the model driver driving profile, the driving mode decision support; indicating the driving mode decision support to the user.

There is further provided in accordance with the present invention a driver assistance component for providing a driving mode decision support to a user for a decision to select a driving mode of driving on at least one road segment, the driver assistance component being adapted to: receive a user driver driving profile; query segment information defining the at least one road segment, the segment information comprising at least a model driver driving profile associated with the at least one road segment; determine, for the at least one road segment, based on the user driver driving profile and the model driver driving profile, the driving mode decision support; indicate the driving mode decision support to the user.

There is further provided in accordance with the present invention a computer program product for providing a driving mode decision support to a user for a decision to select a driving mode of driving on a road segment, the computer program product method comprising: a computer readable storage medium having computer usable code embodied therewith, wherein the computer readable storage medium is not a transitory signal per se, the computer usable program code comprising: computer usable code configured for receiving a user driver driving profile; computer usable code configured for querying segment information defining the road segment, the segment information comprising at least a model driver driving profile associated with the at least one segment; computer usable code configured for determining, for the road segment, based on the user driver driving profile and the model driver driving profile, the driving mode decision support; and computer usable code configured for indicating the driving mode decision support to the user.

DETAILED DESCRIPTION

Figure 1:
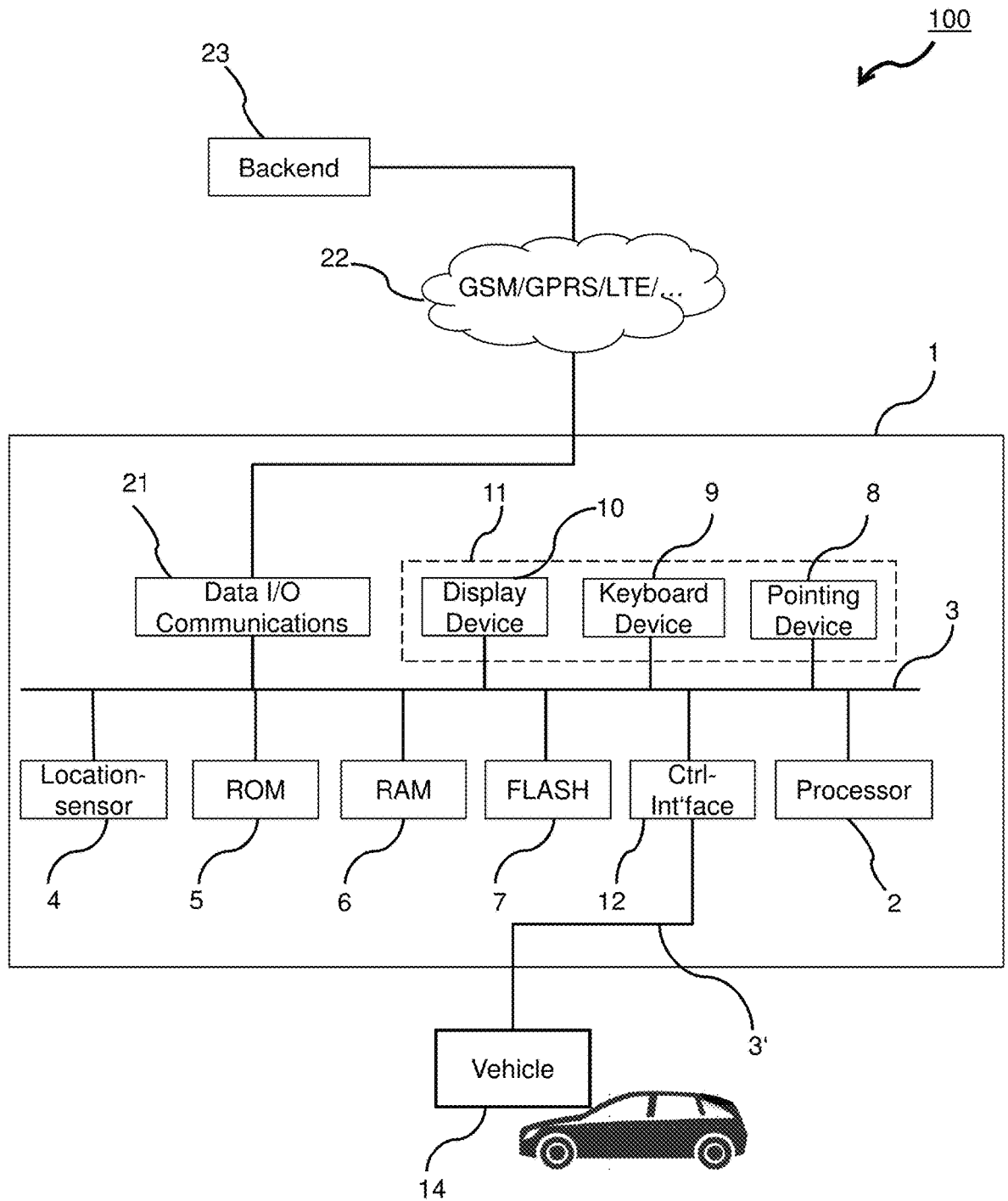
FIG. 1 shows an overview of a driver assistance apparatus arranged in a system of cooperating components according to an embodiment.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to a user or driver by using the personal pronoun "he" or "him". Of course, the intention of the present disclosure is also to comprise female users or drivers or other users or drivers. For the ease of legibility only, throughout the text, the gender does not change.

There is a problem of determining situations in which the driver will choose to drive by himself and in which the driver will choose to let the vehicle drive autonomously. The issue is relevant if one considers that driving a car is still appreciated by humans. For example, a novice will be likely be required to learn how to drive. Another example is a situation, when a long journey by car is to be split into some parts of human-driving periods and some parts of autonomous-driving. In yet another example, how to best split an 8-hour car journey if the driver is willing to manually drive only one hour?—For example, the driver most probably does not want to drive during time periods or section of a route in what he might consider to be the worst part of the trip or travel route.

Embodiments of a method described below may provide a driving mode decision support to a user for a decision to select a driving mode of driving on at least one road segment. This may have a benefit that a user may take a decision for a driving mode to be selected, based on a suggestion or a driving mode decision support issued by, e.g., an appropriate computing component.

Embodiments of the method may further comprise receiving a user driver driving profile. This may have a benefit, that, in a further step, the driving profile of the individual user might be taken into account, e.g., for providing the driving mode decision support. As used herein, the term user driver driving profile refers in particular to the driving profile of the actual user or user driver. The user driver driving profile or user attribute may comprise, at least, a preferred driving style of the user. The user driver driving profile may further comprise a preferred switched driving mode for each kind of segment type. For example, a preferred driving style of the user might be sportive or sport; in that case, if the segment is of type "linear", then the preferably switched driving mode for the segment type "linear" might be "fully autonomous" and, e.g., if the segment is of type "serpentine" or "high speed allowed", then the preferably switched driving mode might be "fully manual". The preferably switched driving mode in relation to a road segment may then be indicated to the user as a driving mode decision support. Thus, a suggestion for switching into a recommended driving mode may be indicated to the user. It is considered that the user driver driving profile may be entered by the user.

Embodiments of the method may further comprise querying segment information defining the at least one road segment, the segment information comprising at least a model driver driving profile associated with the at least one road segment. This may have a benefit, that a driving profile of a model driver might be known and used. In comparison, whereas the user driver driving profile is an individual driving profile of the actual user, on the contrary, the model driver driving profile is a driving profile of an abstract model driver. In other words, the driving profile of the actual user driver may be unique to the individual or regarded as subjective, whereas the driving profile of the model user driver may be regarded as objective, or, a measure, to which an individual user driver driving profile might be compared.

Embodiments of the method may further comprise determining, for the at least one road segment, based on the user driver driving profile, which may also regarded as a user attribute, and the model driver driving profile, the driving mode decision support. This may have the benefit, that the driving mode decision support is a suggestion based on objective information concerning the model driver driving profile related to the individual or subjective information concerning the actual driver or user driver profile.

Embodiments of the method may further comprise indicating or presenting the driving mode decision support to the user. This may have the benefit, that the actual user gets to know, what embodiments of the present method would recommend to him.

According to one embodiment, the method may further comprise, that querying the segment information comprises querying a service at a computer server for providing at least one model driver driving profile, or, model driver attribute. This may have the benefit, e.g., that a comparison of the user driver driving profile of the actual user and the model driver driving profile may always be based on a model driver driving profile that is up-to-date, because it is maintained on, e.g., a server site.

According to one embodiment, the method may further comprise, that the model driver driving profile is based on evaluated statistical data of measured driver behavior. This may have the benefit, that gathered data of switching decisions related to different types of road segments, the switching decisions taken by drivers of different preferred driving styles, may be stored and evaluated in a manner, that switching decisions that are taken with the highest frequency in regard to a specific preferred driving style might be taken as a basis for a model driver, which, again, might be taken as a decision support or suggestion, from past measured data, to an actual user. This is even possible without exactly knowing what type of road the respective actual road segment is.

According to one embodiment, the method may further comprise, that the segment information further comprises at least one identifier for geographically identifying the at least one road segment on a road. This may have the advantage that it is known, at which location the road segment is supported. The identifier may comprise geolocation data, as for example, latitude and longitude, for a multiplicity of points on the road segment. Alternatively, the identifier might comprise only, or additionally, a number uniquely identifying, nationwide, the very road segment from all road segments.

According to one embodiment, the method may further comprise, that the segment information further comprises a model driver driving mode decision. This may have the benefit, that the model driver driving mode decision is stored in relation to an identified road segment. In other word, an experience based on decisions of a multiplicity of past drivers may be taken to form the model driver, based, e.g., on statistical evaluation of the measured data taken from the past drivers.

According to one embodiment, the method may further comprise, that the model driver driving mode decision is one of at least driving-manually, driving-semi-autonomously, or driving-fully-autonomously. This may have the benefit, that providing the driving mode decision support may not only be based on two driving modes, i.e. driving manually or driving autonomously, but adapted, in a fine granular to manner, to include one or more intermediate stages of different types of driving semi-autonomously.

According to one embodiment, the method may further comprise, that the driving mode decision support is one of at least driving-manually, driving-semi-autonomously, or driving-fully-autonomously. This may have the benefit, that a user may select between one or more driving modes between fully manual and fully autonomously. For example, a user driver might enjoy having the steering wheel under his manual control, whereas, at the same instance, he would prefer leaving the velocity decision to be calculated by the device performing this method. This might have the benefit, in one example, that the velocity decision might be taken based on optimizing the protection of the environment.

According to one embodiment, a driving mode decision support of driving-semi-autonomously comprises at least one degree of driving semi-autonomously. This may have the benefit of providing flexibility to the user driver concerning the selected driving mode.

According to one embodiment, the method may further comprise receiving a destination location. This may have the benefit that, from a starting point, a multiplicity of driving mode decision support indications may be given to the user.

According to one embodiment, the method may further comprise determining at least one travel route to be followed to reach the destination location, the travel route comprising the route segment. This may have the benefit, that the user may get an overview of recommended switches over a whole travel route.

According to one embodiment, the method may further comprise determining the driving mode decision support for multiple road segments of a geographical region and graphically indicating or presenting the respective driving mode decision support for each road segment to the user. This may have the benefit, that the user receives overview information of switching recommendations over the complete selected geographical region, thus being able to select a travel route that best matches his preferences.

According to one embodiment, the method may further comprise, that graphically indicating the driving mode decision support comprises distinguishably indicating the respective driving mode decision support. As a result, the road network of a region might be graphically represented in a mosaic kind of representation of different driving mode suggestions according to the user driver profile. This may have the benefit, that the user driver may, on his own, select parts of the region, where he might drive simply for enjoying driving, or, which he might try to avoid.

According to one embodiment, the method may further comprise, that a driving profile of a driver comprises at least a preferred driving style, and, for each type of road segment a preferred switching suggestion indicating a preferred driving mode decision. This may have the benefit, that such data from past drivers may, after being statistically evaluated, provide an improved model driver.

According to one embodiment, in the method, the step of determining the driving mode decision support may further comprise querying a table of rules. This may have a benefit that a driving mode decision support or driving mode suggestion may be made to a user rapidly.

According to one embodiment, the method may further comprise, that the table of rules comprises at least a model driver driving profile and a user driver driving profile as independent fields and a driving mode decision support as dependent field. This may have the benefit that the maintenance of the table is kept easy.

According to one embodiment, the method may further comprise prompting the user to enter a decision of the user. This may have the benefit, in particular when in communication with a vehicle control, that the vehicle control may control the driving of the vehicle, if the user enters at least a decision indicating at least semi-autonomous or even autonomous driving to the vehicle control.

According to another aspect, a driver assistance component for providing a driving mode decision support to a user for a decision to select a driving mode of driving on at least one road segment is provided. This may have the benefit that a user may easily plan a travel route that he is going to drive on.

The driver assistance component may be adapted to: receive a user driver driving profile; query segment information defining the at least one road segment, the segment information comprising at least a model driver driving profile associated with the at least one road segment; determine, for the at least one road segment, based on the user driver driving profile and the model driver driving profile, the driving mode decision support; indicate the driving mode decision support to the user. Benefits and further explanation as set forth above and also apply here.

The driver assistance component may further comprise an interface to receive input from a user. This may have the benefit, that the driver assistance component may flexibly accept wishes of the user to be taken into account for. The interface may be a touchpad or a microphone. The driver assistance component may be a smart phone, a tablet computer, an integrated tablet computer integrated into a cockpit of a vehicle, or a personal computer or a laptop computer.

The driver assistance component may further comprise an interface to receive segment information from an external device. This may have the benefit, that the driver assistance component may receive up-to-date data, e.g., from a server. This may have the further benefit, that complicated computational tasks may be sent towards a server having much more computational power than the driver assistance component, and simply receive the result from the server.

The driver assistance component may further comprise a computing unit, comprising at least a processor, memory and a bus to determine the driving mode decision support. This may have the benefit, that the driver assistance component may be implemented like a general purpose computer, making maintenance and operability easier for a user.

The driver assistance component may further comprise an interface to output at least the driving mode decision support indication to the user. This may have the benefit, that the user may be informed about a recommendation and computational results achieved by the driver assistance component or effected through it. The output interface may be a touchpad, an independent display, or a loudspeaker.

Thus, according to one embodiment of the driver assistance component, the interface to receive the user driver driving profile and the interface to output the driving mode decision support indication to the user are at least one of a touchpad or a voice controlled component.

Thus, according to one embodiment of the driver assistance component, the driver assistance component is at least one of a smartphone, a tablet computer, or a tablet computer integrated into or removably mounted on a surface of a cockpit of a vehicle.

According to an aspect, a computer program product for providing a driving mode decision support to a user for a decision to select a driving mode of driving on a road segment, is provided. The computer program product may comprise a computer readable storage medium having computer usable code embodied therewith, wherein the computer readable storage medium is not a transitory signal per se.

The computer usable program code of the computer program product for providing a driving mode decision support to a user for a decision to select a driving mode of driving on a road segment may comprise computer usable code configured for receiving a user driver driving profile.

The computer usable program code may further comprise computer usable code configured for querying segment information defining the road segment, the segment information comprising at least a model driver driving profile associated with the at least one segment.

The computer usable program code may further comprise computer usable code configured for determining, for the road segment, based on the user driver driving profile and the model driver driving profile, the driving mode decision support; and computer usable code configured for indicating or presenting the driving mode decision support to the user. The benefits and further information concerning the above features have already been set forth above and, thus, also apply here.

According to a consideration, a method for operating a driver assistance apparatus is envisaged.

The present method as described below may provide support in operating a driver assistance apparatus.

This may have a benefit that a driving experience of a driver is improved or the security or safety of the traffic on the roads is improved. The driver assistance apparatus may be adapted to operate a vehicle either in a manual driving mode or in an at least semi-autonomous driving mode. This may have the benefit that a driver, when the driver assistance apparatus operates in the at least semi-autonomous mode, may rest, so that he can continue driving manually, on a longer travel route, when he is relaxed and refreshed.

Thus, security or safety on the road can be enhanced. Or the driver can choose to drive manually when the road is fun to drive, so that he can gain an improved personal driving experience. In an alternative scenario, if the driver is a beginner, he can let the car drive alone, i.e. autonomously, so that there is no risk for himself and the other participants on the road. Alternatively or additionally, different stages of at an least semi-autonomous driving mode may be activated.

For example, a driving mode might be fully autonomous. This may have the benefit, that the user is not urged to do anything, but simply enjoy the environment, or, if legally allowed, even sleep.

On an intermediate stage of semi-autonomous driving, for example, the actuating of the steering wheel might be left to the user, whereas decisions concerning the velocity of the vehicle are completely controlled by the driver assistance apparatus. This may have the benefit, that the user might enjoy a road segment having lots of curves, whereas the driver assistance apparatus provides for an ecological or economic consumption of energy.

The method may further comprise providing a driving mode decision support to a user for a decision to select a user driver driving mode of driving on at least one road segment.

The method may further comprise receiving the user driver driving profile.

The method may further comprise querying segment information defining the at least one road segment, the segment information comprising at least a model driver driving profile associated with the at least one road segment.

The method may further comprise determining, for the at least one road segment, based on the user driver driving profile and the model driver driving profile, the driving mode decision support.

The method may further comprise indicating or presenting the driving mode decision support to the user.

The benefits of the above features have already been set forth and discussed and, thus, apply here.

The method may further comprise prompting the user to enter a decision of the user. This may have the benefit, that the driver assistance apparatus may be informed about the decision of the user, and, thus, may be able to work as the user wishes.

The method may further comprise receiving a destination location. This may have the benefit that a starting point for a route may be given.

The method may further comprise determining at least one travel route to be followed to reach the destination location. This may have the benefit that a driver may control from which starting point to which destination point he is going to drive. In this regard, the term driver as used herein refers to the person that operates the driver assistance apparatus.

Usually, this will be the driver or, at least, the person that is in the role to drive the vehicle. Of course, also an assistant driver may operate the apparatus. Even a person that is not willing to drive, but only intends to plan a route, may operate the apparatus. In the present context, thus, the term driver may also have the meaning of user and vice versa.

The method may further comprise querying segmentation information defining the at least one travel route, the segmentation information comprising at least one segment of the at least one travel route and a segment attribute associated with the at least one segment. This may have the benefit that not the whole travel route has to be treated as a whole, but, merely, the travel route may be regarded to be broken down in segments.

A segment of a travel route may be a part of the travel route that is consistent in itself, i.e., has an attribute or multiple attributes that are homogeneous or constant over the complete length of the segment. In the case of a short travel route, of course, the short travel route may be established or defined by a single segment. The term segmentation information as used herein refers to the segments that, when stuck together, are identical to the complete travel route. Further, the segmentation information not only may comprise the geographical information of begin, path and end of the segment, but also may comprise a segment attribute, i.e. attribution information, as for example, "appropriate for novice drivers" or "appropriate for sport drivers" or "appropriate for touristic drivers" or similar.

In other words, the segmentation information may comprise geographical data and attribute information. The segmentation information may be obtained, in the driver assistance apparatus, from a memory coupled to or integrated within the driver assistance apparatus. Alternatively, the segmentation information may be obtained from a remote server. The driver assistance apparatus may be in continuous connection, via a wireless interface, with a server. The driver assistance apparatus may be provided with a predictive cache mechanism that makes assumptions about the next locations or intermediary stops that might be selectable by the driver, and pre-fetch the relevant information from the server in the local cache of the driver assistance apparatus.

The method may further comprise determining, for the at least one segment, based at least on the segment attribute and an attribute information entered by a user, a driving mode switching flag. This may have the benefit that a recommendation may be determined, for the user or driver driving the vehicle, as to whether or not he should drive or would like to drive. As used herein, the term attribute information that is entered by a user refers to the user preference of driving the vehicle. For example, the user might attribute himself to be a novice driver, so, the attribute information might read something like "novice" or similar. As well, the user might be an advanced or sport driver, so the attribute information might read something like "sportive profile" or "advanced profile". Finally, even a sport or advanced driver might, occasionally, dependent on the travel route, decide to enjoy some sightseeing over at least some parts, or segments, of the travel route. In that case, the user might select or enter the attribute information "tourist".

The determining of the driving mode switching flag may be performed completely on the client, i.e., the driver assistance apparatus, or, alternatively, on the server. Alternatively, the determining of the driving mode switching flag may be determined in cooperation of the driver assistance apparatus and the server.

The term driving mode switching flag as used herein is a value, internal to the driver assistance apparatus or to the server, refers to the result as to whether the driver would probably decide to drive by himself or let the driver assistance apparatus control the car in order to drive at least semi-autonomously. The driving mode switching flag may, thus, have at least two values, e.g., "Drive autonomously" and "Drive manually", or, additionally, "Drive semi-autonomously". The term semi-autonomous as used herein may refer to the different levels of autonomy, according, e.g. SAE, between level 0 (zero), i.e. not automation at all, and level 5 (five) full automation, the latter one being completely independent of a human being as a fallback resource. In embodiments, the driver assistance apparatus may be able to switch between each of the levels of autonomous driving from level 0 (zero) to level 5 (five).

Embodiments of the method may further comprise indicating or presenting the driving mode switching flag to the user. This can have the advantage that the driver sees the recommended switch for the next segment on the route, e.g. one of the values corresponding to the autonomy levels from zero to five. The display can be optical, e.g. on a touch panel of the driver assistance, or acoustic.

The user may be prompted to accept the recommendation. In case, the driver assistance apparatus recommends, for the subsequent segment, a lower level of autonomous driving, e.g., from full automation down to completely manually, and the driver does not accept the recommendation, or does not react to the driver assistance apparatus prompting at him, the driver assistance apparatus might issue an emergency signal, because it is to be assumed, that something happened to the driver.

The method may thus further comprise, upon indicating the driving mode switching flag to the user, prompting the user for an answer to select a driving mode. Only when the user responds to the prompt does the vehicle switch to the desired driving mode, controlled by the driver assistance device. This can have the advantage that the human driver always has control over whether he should drive manually or autonomously.

According to a further consideration, determining the at least one travel route comprises querying a map service. This may have the benefit that only up-to-date data is used for building up the travel route. The driver assistance apparatus may directly contact a map service or the driver assistance apparatus may contact its corresponding server that, again, contacts the map service. The map service may be a free, open map service or a commercial map service.

According to a further consideration, querying segmentation information comprises querying a service providing statistical data of measured (other) driver behavior. This can have the advantage that the driver assistance device can make suggestions to the driver based on the behavior of many drivers collected previously on a segment, which the driver will most likely tend to accept. The term server as used herein is intended to refer to the server corresponding to the driver assistance apparatus working as a client. Thus, to be exact, the server should be denoted as driver assistance server, and the system established by the two entities of the driver assistance apparatus and the driver assistance server may be denoted as driver assistance system. For sake of simplicity, however, the wording for the driver assistance server will remain "server".

According to a further consideration, the segment attribute comprises at least a driver profile and a driving mode. This may have the benefit that a recommendation or suggestion to the driver may be based on a thorough database. The driver profile may have, for example, one of the values of sportive, novice, or sightseeing, whereas the driving mode may have at least one of the values manual or automatic. Of course, it may be considered that the driving modes may have one of the values between 0 (zero), i.e. fully manual, and 5 (five), i.e. fully autonomously.

According to a further consideration, the attribute information entered by the user comprises a profile of the user. This may have a benefit that the corresponding data may be easily retrieved.

According to a further consideration, the method further comprises graphically representing the travel route and representing each segment distinguishable according to the associated driving mode switching flag. This may have a benefit in that the driver at one glance has an overview of all roads in the region he is driving on. Thus, he may be able to decide on his own to take a route, even if longer, that matches his interests. It is considered that the method thus may further comprise receiving a starting point in addition to the destination point.

According to a further consideration, the driving mode switching flag may comprise either a value representing manual driving or a value representing autonomous driving. Of course, alternatively, the driving mode switching flag may take one of the values between 0 (zero) and 5, as already explained above.

According to a further consideration, the method further comprises automatically operating the vehicle based on the driving mode switching flag. In particular in case of suggesting a lower level of autonomy this may have the benefit that the car will be continuously driving, because the driver assistance apparatus maintains the recent level of autonomous driving, so that there will not be a negative impact on security or safety.

According to a further consideration, the method further comprises querying or prompting the user regarding the amount of time he is willing to manually drive. This may have a benefit in that, based on this information, the driver assistance apparatus may determine segments, where the driver drives by himself, i.e., manually, and determine other segments, where the driver is letting the driver assistance system drive the car at least semi-autonomously. In other words, a method for partitioning a travel route may be provided the partitioning specifying parts or segments to be driven manually and parts to be driven at least semi-autonomously.

According to a further consideration, the method further comprises querying other services for additional information concerning the travel route and, based on the additional information and the user profile, determining time intervals of manual driving and time intervals of at least semi-autonomous driving, the additional information comprising at least properties of the travel route. This may have the benefit that the driver may be provided with comprehensive information concerning his intended travel route. For example, he might be informed about events, such as sport events, or about the weather conditions that are to be expected at specific parts of the travel route. Such information may be queried by the driver assistance apparatus, as a client, towards its corresponding server, that, in turn, queries other information providers.

According to a further consideration, the method further comprises determining environmental information concerning the travel route, the environmental information comprising, at least, an existence of neighboring scenic spots, time of day, events, weather, season, or a status of traffic congestion. This may have the benefit that the driver may decide to change his travel route, departing from the suggested or recommended travel route, in order to visit an event or avoid route segments with bad weather conditions.

According to a further consideration, the method further comprises prompting the user for an amount of time that the user intends to drive manually; querying, e.g. from the driver assistance apparatus towards its corresponding server, a database or information service provider for information regarding the preferred profile of the user; matching the information regarding the preferred profile against the segments of the travel route, e.g. in order to find sites of interest or segments of interest; sorting the information regarding the preferred profile according to its rank values; determining the segments of the travel route having the highest ranked, e.g. sites of interest or segments of interest; associating the segments of interest with segments of the travel route; and letting the determining of the driving mode switching flag be based on the result of the associating. This may have the benefit that a travel route may be divided into parts to be driven manually and parts to be driven at least semi-autonomously, so that the driver gets the most out of his journey.

According to a further consideration, the amount of time expected to elapse during driving the segment is above a minimum threshold. For example, the minimum amount of time is five minutes, because less than five minutes would not have a beneficial effect on the driver. This may have the benefit that a driver can, e.g. rest for a reasonable amount of time or enjoy a challenge segment of a road not only for a few seconds, but for an appreciable amount of time. The minimum amount of time may of course be configured for any time desired by a user, e.g. 10 minutes or 15 minutes.

According to an embodiment, a system comprises a driver assistance apparatus that is adapted to execute the method as described above and at least one server, or a driver assistance server, communicatively coupled to the driver assistance apparatus, the server being adapted to respond to a query of the driver assistance apparatus. The benefits are already given in the discussion of the method, above, and also apply here.

According to a further consideration, the server comprises at least a database of user's profiles, a database of route segments or a route breakdown, a database of user's choices, and a database of consolidated statistics. This may have the benefit, that all necessary data for indicating a switching recommendation to the user may be rapidly and easily accessible.

According to a further consideration, the server is communicatively coupled to external resources, that may comprise at least a map provider or a provider of other additional information. This may have the benefit that specialized third parties, specialized, e.g., on providing road and map information, or event information or weather information or similar, can concentrate on their central issues, and providing their results to the driver.

According to a further consideration, a computer program product for controlling an operation of a driver assistance apparatus is envisaged, wherein the driver assistance apparatus may be adapted to operate a vehicle either in a manual driving mode or in an at least semi-autonomous driving mode. The computer program product may comprise a computer readable storage medium having computer usable code embodied therewith, wherein the computer readable storage medium is not a transitory signal per se. The computer usable program code may comprise computer usable code configured for performing each of the method steps as already described above, the benefits, thus, also applying here.

According to a further consideration, a method for segmenting a given travel route to obtain segmentation information defining the travel route is considered herein. This may have the benefit, that pieces (or segments) of roads are analyzed and evaluated, the result of which can be used for operating a driver assistance apparatus or, for modifying regulations on a road, in order to enhance security or safety of traffic. It is to be understood that in this regard, in the expression segmentation information defining the travel route, the term defining may mean, that taking all the segments comprised by the segmentation information, one after the other, together, may establish the complete travel route.

The method may further comprise obtaining, or, alternatively: receiving, a driving mode of a driver driving along the given travel route, the driving mode being indicative of the driver driving manually or at least semi-autonomously. This may have the benefit, that it may be detected, as to whether the situation on the road is of the kind that a user feels the pressure to switch from manual driving mode to automatic or autonomous mode, or at least semi-autonomous driving mode. Thus, it is possible to detect circumstances that might be directly associated with the local situation of the road. As a consequence, an authority that is responsible for this very segment of the road may see an indication that the regulations concerning this very location might have to be amended.

The method may further comprise obtaining a driver profile, or a driver preference, indicating the driving style of the driver. For example, a driver profile might have a value of "sportive driver," "novice driver," "sightseeing driver," "tourist driver," "commuting driver," respectively. This may have the benefit, that the consistency of the data may be checked: For example, statistically, if the sportive driver switches very often in a segment of analysis and the novice drivers don't, in that case, the number of switches might be due to an impatience of the sportive drivers. However, if all types of drivers switch at the same location, the reason might lie in the situation or local circumstances of the road. In such case, the responsible authority might be interested to analyze the situation to find a cause, and, eventually, fix the cause, in order to obtain fluid traffic.

The method may further comprise counting the switches of the driver or the respective drivers switching from driving manually to at least semi-autonomously and the driver switching from at least driving semi-autonomously to driving manually. The benefit may be, that reliable statistical data may be obtained.

The method may further comprise searching for all relative maxima of the counted switches of the given travel route. This may have the benefit that the large amount of data may be reduced to only few but meaningful pieces of information.

The method may further comprise defining segment borders or boundaries of the given travel route at the geographical locations of the relative maxima, thus obtaining segmentation information of the given travel route, the segmentation information thus defining the given travel route. This may have the benefit, because of the statistical nature of this feature, that a segmentation is provided that will be accepted by most drivers.

According to a further consideration, a computer program product for segmenting a given travel route to obtain segmentation information defining the given travel route is envisaged. The computer program product may comprise a computer readable storage medium having computer usable code embodied therewith, wherein the computer readable storage medium is not a transitory signal per se, wherein the computer usable program code comprises computer usable code configured for executing each step as already described above with respect to method for segmenting a given travel route to obtain segmentation information defining the travel route. As the benefits are already discussed above, they will not be repeated here.

Embodiments of the present invention may be a system, a method, or a computer program product. The computer program product may include a computer readable storage medium (or media) having computer readable program instructions thereon for causing a processor to carry out aspects of the present invention. A driver assistance apparatus or driver assistance component or a server as described below may be arranged to carry out such computer readable program instructions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In other words, a solution for answering the problems set forth in the beginning of present description might be provided by the features set forth above and reproduced as follows:

The answer for solving the above problem may, thus, involve a plurality of variables, the most important being the kind of road and the condition on it, and the driver's preferences. For example, a driver can prefer a highway, another one can like more curves, and another one might like straight roads.

Until now, there was not a 'map' of such information: when a user sets a route to go from point A to point B, until now, there was no device or apparatus or system that was able to inform about a classification of segments of the travel route, based on the information if that piece or segment is more likely to be appreciated by a user to drive manually or it is better to leave such incumbency to the self-driving car.

Provided is a driver assistance apparatus or driver assistance system that, based on the position of the car or a preselected route, or both, uses information about the route, i.e. the next piece of road can be identified as the next meaningful piece of road with some characteristics, about the condition of the route, i.e. traffic, weather conditions, accidents, and the user preferences, from previous usage of the same system or by manual input, to provide a suggestion to the user about manually driving the car themselves. In case that, from the resulting map, the suggested interval to drive is longer than the driver's willingness to drive, i.e. the route allows 1 hour to drive while the user wants to drive just 30 minutes, the system is also able to suggest "the best 30 minutes" of the segment to drive. Clearly, a simple variation of this solution is that, once a planned route is selected, the system can inform in advance about a suggested plan for driving or not.

The driver assistance system may include one or more of the following: A backend system or a driver assistance server system, which: Continuously processes a vehicle's position and calculates the next piece of road under analysis, and/or verifies that the car is on the preselected route, and/or stores user's profile and store user's decision for each piece of route, for further reuse; and/or retrieves $3^{rd}$ parties traffic and/or weather conditions for possible corrections, e.g. daily, exceptional or seasonal corrections, and/or gets user feedback about a decision to drive or not, learning from the user and feeding a machine learning algorithm, thus creating a map; and/or provides static information about such suggestions, decorating/enhancing a map, in the same way traffic information are for example reported in a map; and/or elaborates the time the driver wants to drive and identify the subset of routes in case the driver's willingness to drive is less than the suggested route resulting from the steps above.

Further, the system may comprise a driver assistance apparatus or client component on a vehicle which may interact with a route planning information provider to get the planned maps, or, just the user position; and/or gives back a plan of driving, and/or suggests driving and leaves the control to the user; and/or allows queries to the backend server or driver assistance server in order to retrieve information about a given piece of road; and/or allows the user to prescribe the amount of time he wants to drive manually.

In one example, a driver assistance apparatus for a vehicle selectively operable in a manual driving mode and an at least semi-autonomous driving mode, may be operable for receiving information about at least a part of a route to be followed by a driver of the vehicle. It may further be operable for querying road condition information related to the route from a map information system. Additionally, the driver assistance apparatus may be operable for determining an indication based on the road condition information, the indication indicating whether the driver should operate the vehicle in the manual driving mode or in the at least semi-autonomous driving mode.

It is considered that determining the indication may be based on preference information maintained by the driver assistance apparatus, the preference information describing the driver's preferences regarding selecting the manual driving mode or the at least semi-autonomous driving mode on a road having specific road conditions.

It is to be understood that parts of the described features of the driver assistance apparatus may be implemented in a distributed manner between the driver assistance apparatus and a corresponding server, thus establishing a driver assistance system.

It is further considered that the apparatus and/or the server is operable for collecting from vehicles switching rate information, the switching rate information describing a measured rate of switching between the two driving modes as a function of a position along the road.

It is further considered that the apparatus and/or the server is operable for identifying the road sections of road based on the switching rate information and wherein the indication is determined in relation to the road sections.

It is further considered that the determining the indication is based on a driving style associated with the driver of the vehicle.

It is further considered that the determining the indication is based on a preferred duration of operating the vehicle a certain driving mode.

It is further considered that the road conditions include at least one of weather conditions or presence of points of interest.

The method may also comprise an identification of subsets of pieces of route to drive depending on the available time.

Once one or more of the steps as described above have been performed, an additional part of the method may be to narrow down the piece of route the user has to drive. For example, the length of the route might correspond 3 hours of driving, and, based on the user's profile, the split would be to drive for 1 hour and rest for 2 hours.

There might be the situation that the user is only willing to drive for just 30 minutes, so the problem is also to suggest the "best 30 minutes" out of the 1 hour.

In order to reach the desired result, the driver assistance system, made up by a driver assistance apparatus and a driver assistance server, may get information from a plurality of external systems or 3rd party systems, as for, e.g., standard maps, other applications providing information about specific locations, like tourist information, traffic, car accidents statistics, to identify, for the route, 'places of interests and/or focal points'. Such places of interests/focal points are dependent on the type of driver profiles, so, for example one can have the following points:

According to a sport driving profile, associated with a driver who might want to drive, e.g., challenging roads, it might be useful to retrieve information from, e.g., social media, concerning challenging turns and/or points, or famous subsets of roads.

According to a novice driving profile, e.g., a driver who might prefer driving easy roads, there might be the wish to avoid crossroads with high possibility of accidents—such information might be retrieved, e.g., from statistics from some street map information server. There might further be a wish to avoid traffic jams in particular conditions of stress.

According to a touristic driving profile, e.g. a driver who does not want to drive manually in case of nice spots or panoramic views or other scenic spots, there might be a wish that the driver assistance apparatus or the driver assistance server or both take into account tourist attractions, based on maps or other internet resources, and take into account top panoramic spots, e.g. from tourist information service providers.

On the basis of having these points or issues in the map of the actual region wherein the driver wishes to travel, the driver assistance system or one or more of its components can 'accumulate' the user's willingness to drive or not to drive around a particular point. This may be achieved by splitting the route with a predefined time-length, e.g. five minutes of driving, into fully-configurable slots, and ranking these five-minutes slots according to the presence or absence of particular points, e.g., particular "points of interest."

FIG. 1 shows an overview of a driver assistance apparatus arranged in a system of cooperating components according to an embodiment.

The shown block diagram illustrates an example computer processing system adapted to implement the methods of the present invention. The computer system, here the driver assistance apparatus is described in more detail below.

A system 100 of cooperating components of a driver assistance system 100 may comprise a driver assistance apparatus 1 that may be arranged to control a vehicle 14 and may receive support, via an over-the-air interface 22 that might be formed by a GSM- or GPRS- or LTE- or 5G-mobile network, from a backend system 23.

The driver assistance apparatus 1 may comprise a processor 2 that may be coupled to other components via a bus 3. The processor 3 may comprise a digital signal processor (DSP), central processing unit (CPU), microcontroller, microprocessor, microcomputer, ASIC or FPGA core.

The driver assistance apparatus 1 may further comprise a user interface, UI, component 11. The UI component 11 may comprise a display device 10, a keyboard device 9, and optionally, a pointing device 8. The display device 10, the keyboard device 9, and the pointing device 8 may be integrated within a touch screen display that is known in the art, such as for example, screen displays on smart phones, tablet computer, and other devices. Alternatively or additionally, the UI component 11 may include a speaker or microphone, or both, neither being shown in the figure, so that the driver may be able to communicate with the driver assistance apparatus 1 in spoken language.

The driver assistance apparatus 1 further may comprise a location sensor 4 that might be a GPS- or GLONASS-receiver or equivalent. Additionally, the driver assistance apparatus 1 may be provided with memory technologies, as for example, a ROM 5 and/or RAM 6 and/or a FLASH memory 7. The driver assistance apparatus 1 may further be provided with a data communication interface 21 to be able to communicate with the backend system 23 and a control interface 12 to be able to send driving control commands towards the vehicle 14 as well as receive data from vehicle sensors.

A driver assistance component for providing a driving mode decision support to a user for a decision to select a driving mode of driving on at least one road segment, as suggested herein, may also described with respect to FIG. 1: The driver assistance component may be implemented similar to the driver assistance apparatus, however omitting the interface 12 to the vehicle. Therefore, the driver assistance component may be realized as a smart phone or a tablet computer or a personal computer without any interface to a control device of a vehicle. Apart from this difference, the components of the driver assistance component operate as the components of the driver assistance apparatus described above.

Figure 2:
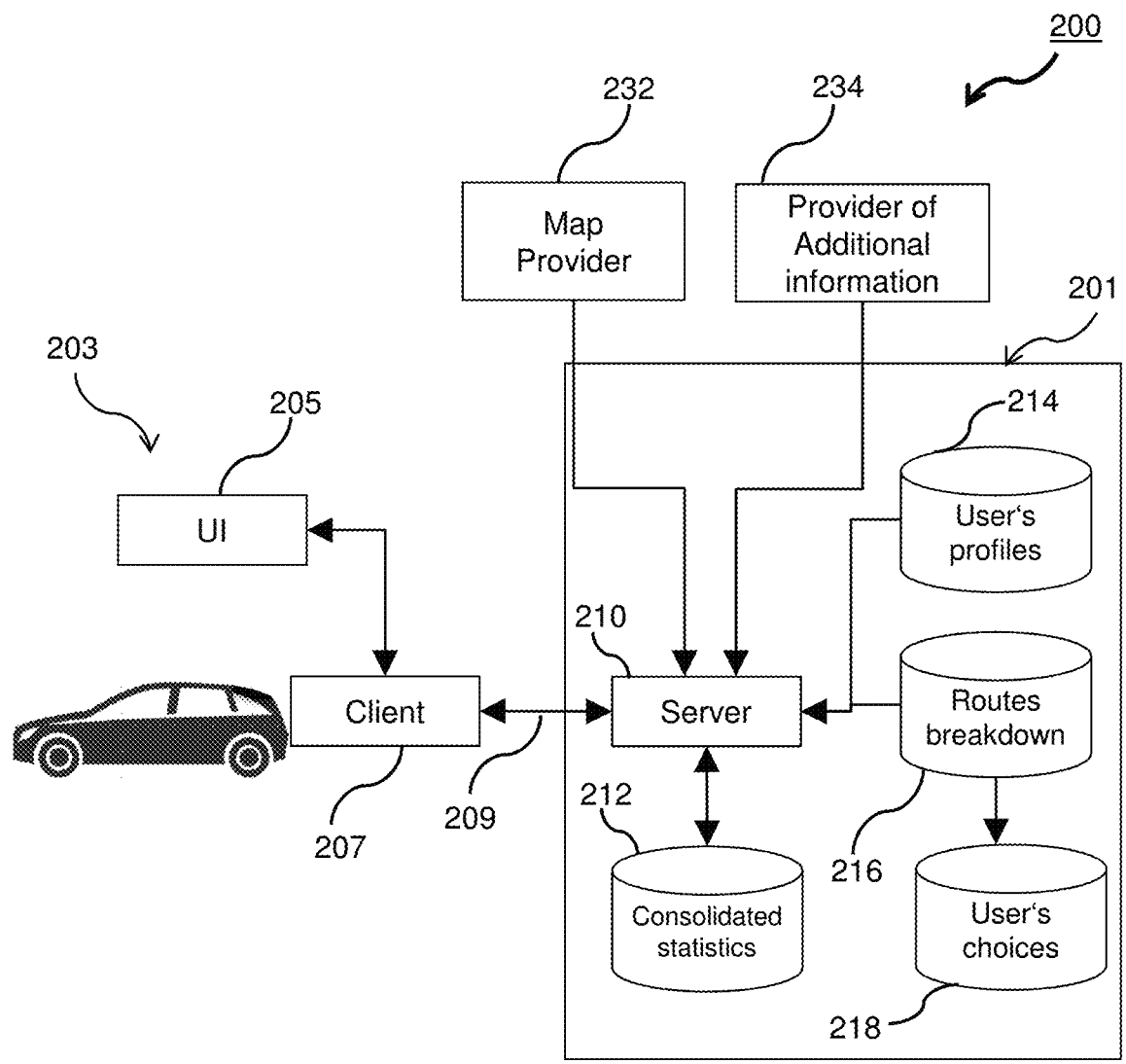
FIG. 2 shows an overview of a backend server arranged in a system of cooperating components according to an embodiment.

FIG. 2 shows an overview of a backend server arranged in a system of cooperating components according to an embodiment.

The shown block diagram illustrates the backend server system 200.

The backend server 201 comprises a server apparatus 210, a database of user's profiles 214, a database of routes breakdown 216 or a database of segmented roads 216, a database of user's choices 218, and a database of consolidated statistics 212 that are all communicatively coupled to the server 210.

The server 210 is able to communicate, via interface 209 that may be identical to interface 22 of FIG. 1, with a client system 203 that may be in correspondence with vehicle 203. The client system 203 may comprise a client 207 that may be in correspondence with the driver assistance apparatus 1 of FIG. 1 and comprise a user interface, UI, 205 that may be in correspondence with UI component 11 as described with reference to FIG. 1.

The backend server 201 may be communicatively, e.g. via internet, coupled to a map provider 232, that might be a free or a commercial map provider.

The backend server 201 may additionally be communicatively coupled to a provider of additional information 234. The provider of additional information may be able to deliver location related information, for example, weather conditions or weather forecast, sightseeing hints or sightseeing places, events as for example music concerts or sport events, that might be followed by traffic congestion.

Figure 3:
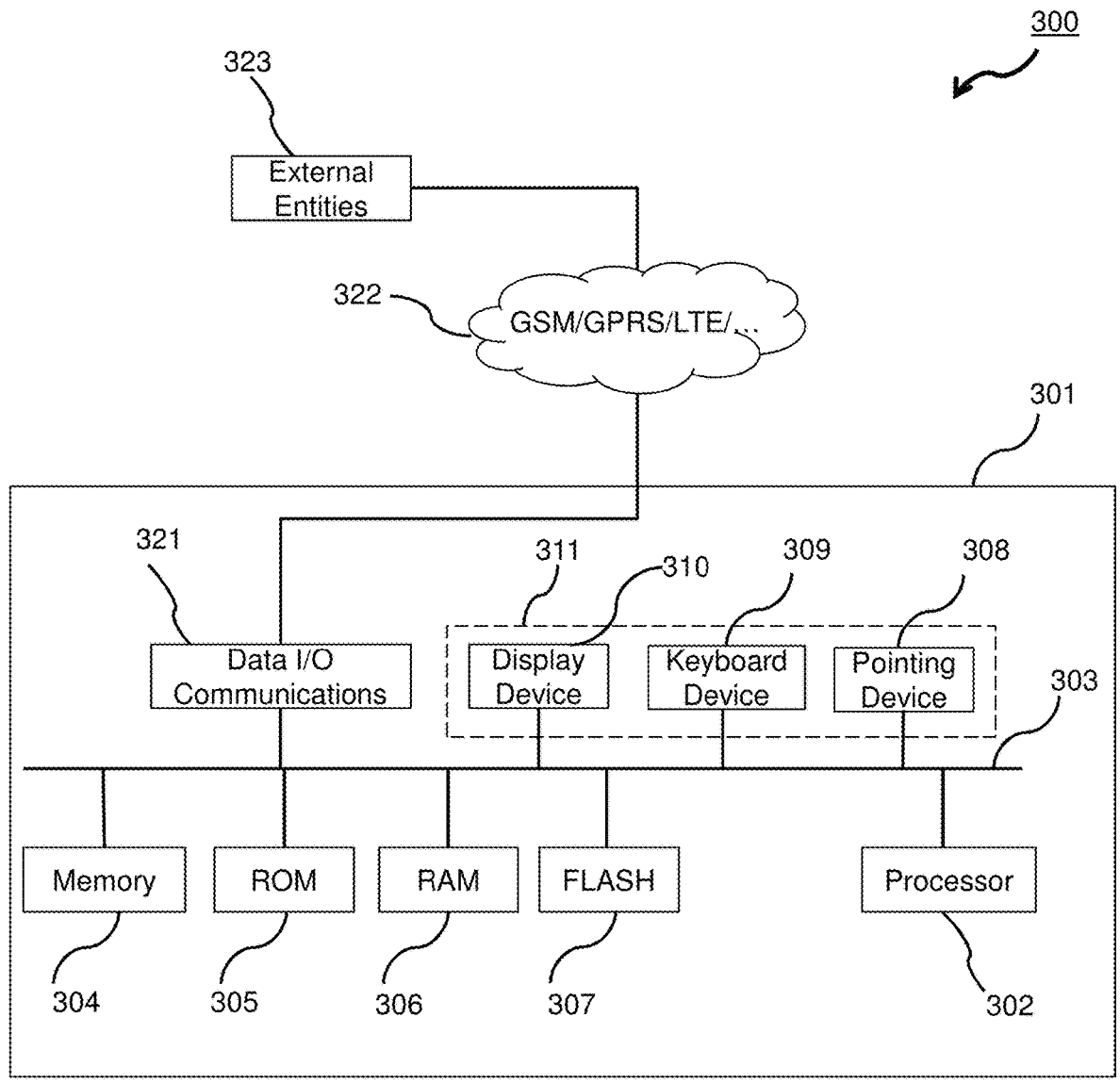
FIG. 3 shows a server component in a system of cooperating components according to an embodiment.

FIG. 3 shows a server component in a system of cooperating components according to an embodiment.

The shown block diagram illustrates another example computer processing system adapted to implement the methods of the present invention. The computer system, here the server system is described in more detail below.

A server system 300 may comprise a server 301 that may be connectable, via a mobile telecommunication connection as is provided, for example, by a GSM-, a GPRS, an LTE- or equivalent standard, herein depicted as 322, to some external entity 323, that may be a driver assistance component 1 as shown in and described with regard to FIG. 1 or a map provider 232 or a provider of additional information 234 as shown in and described with regard to FIG. 2.

The server 301 may comprise a processor 302 in principle similar to the processor already described above, the processor 302 being connected via a bus 303 to other cooperating components such as a memory 304 that might comprise a ROM 305 and/or a RAM 306 and/or a FLASH 307 and/or SSD modules or hard disk drives, both not shown herein. Not necessarily, the server 301 may further comprise an administrator user interface, UI, 311, that may comprise a display device 310, a keyboard device 309 and a pointing device 308.

The server processor 302 may be coupled, via bus 303, to an interface component, data I/O communications 321, that may be adapted to enable communication with external entities 323.

Figure 4:
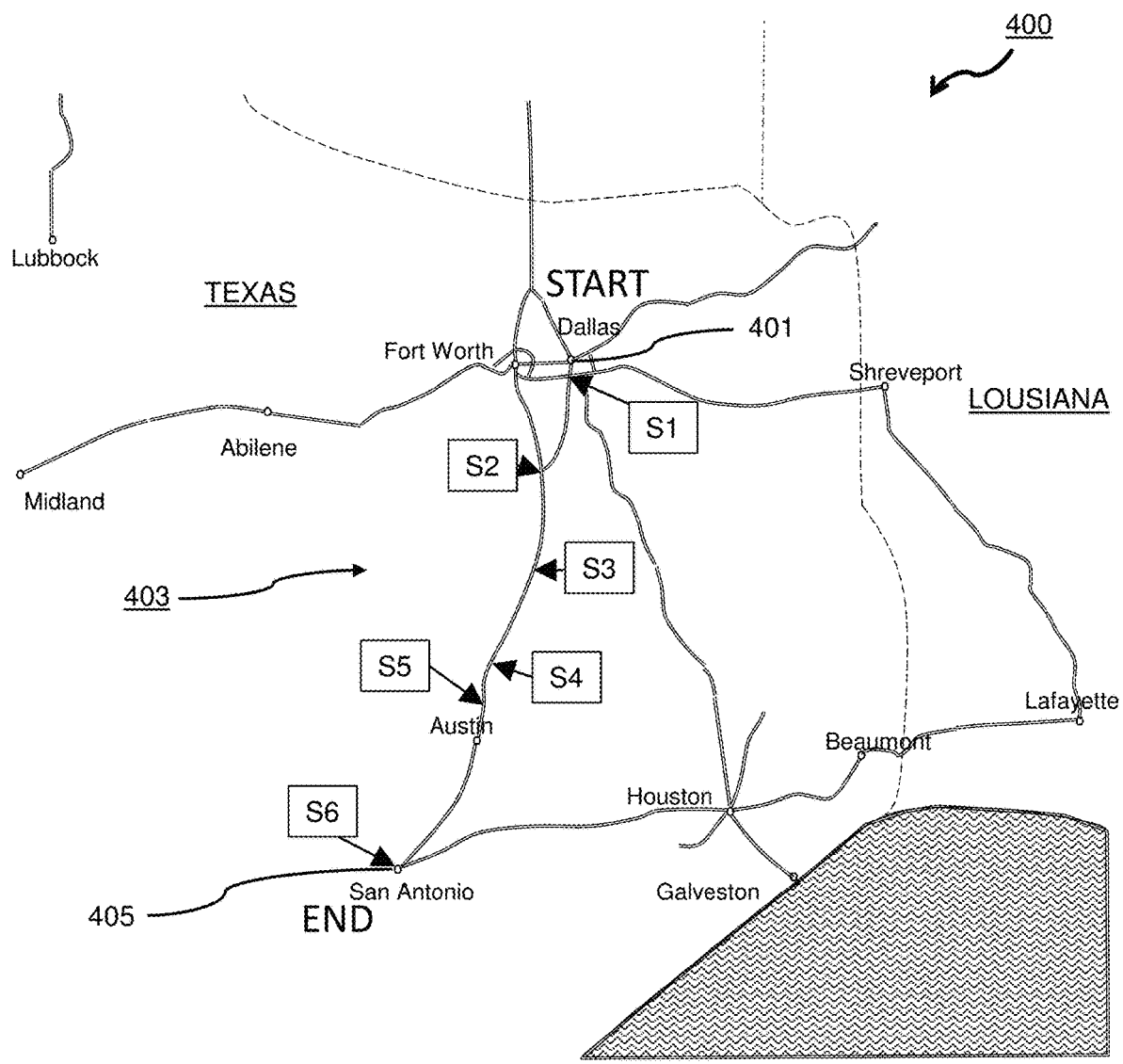
FIG. 4 shows an exemplary travel route to be segmented according to an embodiment.

FIG. 4 shows an exemplary travel route to be segmented according to an embodiment.

By reference sign 400, in FIG. 4, exemplarily only, a map is shown having some cities connected by some roads. In this example, a start location 401, START, and an end location 405, END, are shown, that are connected via a chain of roads 403, that comprises at least one road.

In order to break down a complete travel route that might be suggested by a map service to follow, in order to reach the destination, meaningful segments have to be found. A meaningful segment may in particular be a part of the road having homogeneous properties: For example, a segment might be a tunnel part or a serpentine part or a straight part and even part of a travel route.

Figure 5:
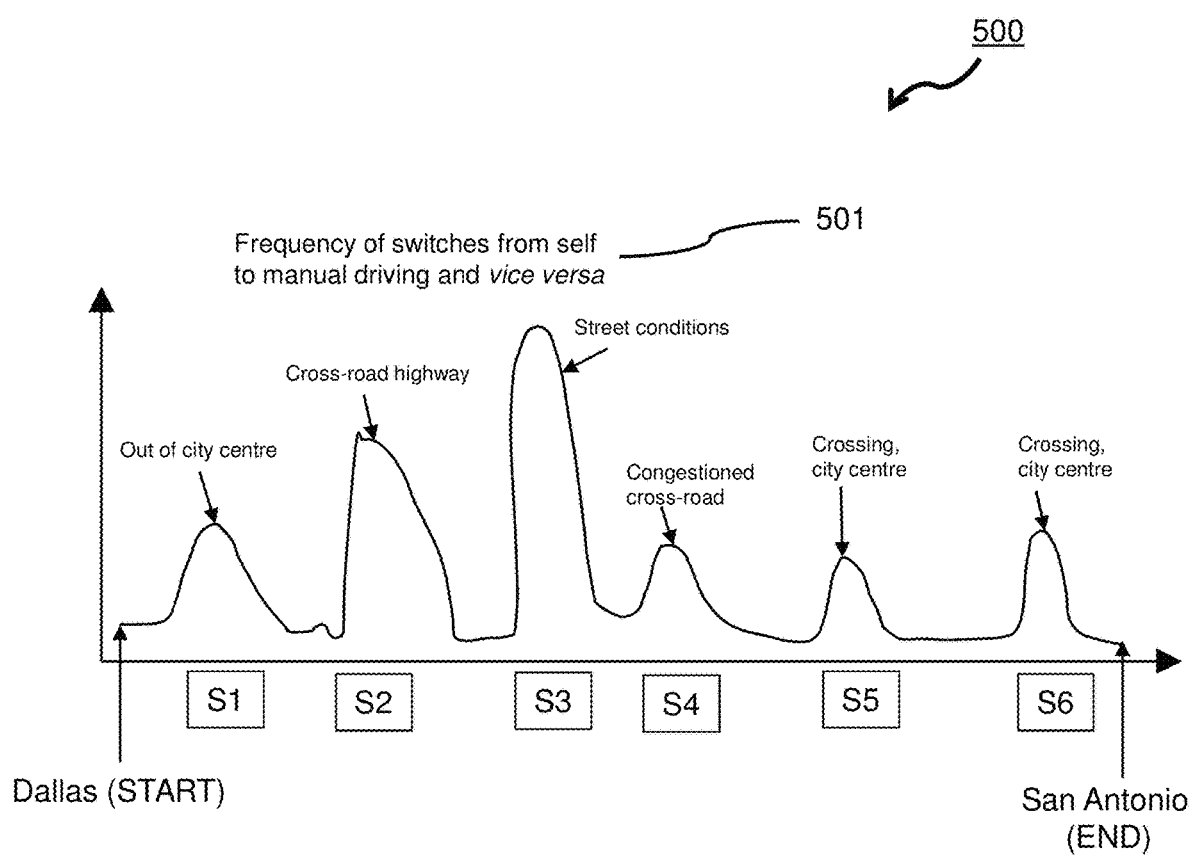
FIG. 5 shows criteria for segmentation of a travel route or a complete region according to an embodiment.

Such segment should not be too long and not too short. Such segments might be calculated by the usage of a map service and, additionally, some extra information, as for, e.g., tourist maps or similar. Alternatively, the segments may be measured, based on the behavior of a large number of users, as explained with regard to FIG. 5:

FIG. 5 shows criteria for segmentation of a travel route, or even of a complete region according to an embodiment.

The server 301 or 210 might collect the behavioral data of drivers into a database 212 and store the results, that is, the segmented parts of the roads, into the database of routes breakdown 216.

The measured property is sensing as to whether or not the drivers switches from manual driving mode to autonomous driving mode or at least semi-autonomous driving mode or back, in dependence of the location along the road.

In the example of FIG. 5, in graph 500, the measured property is shown in dependence of the location from START to END: Directly after the START, the switching events are low, coming closer to S1 they reach a local maximum which might be caused when the drivers are driving out of the city center. Subsequently, the switching events lower in number until they reach a second local maximum, S2, that might be caused by a cross-road highway. Subsequently, different circumstances, such as for example, street conditions, a congested crossroad, crossing or city center, may be responsible for further relative maxima of switching events. The different relative maxima of switching events may be found on the map of FIG. 4 at the respective places on the map.

In this regard it is to be noted that is does not matter, whether the driver switched from manual driving mode to autonomous driving mode or at least semi-autonomous driving mode. It is sufficient to measure that the driver has switched driving mode. Additionally, it is necessary to have information about of what type the driver is, for example a sport driver or a novice driver or a touristic driver, just to name some examples.

Based on the relative maxima along the travel route from START to END, the segments of the route may be defined.

Figure 6:
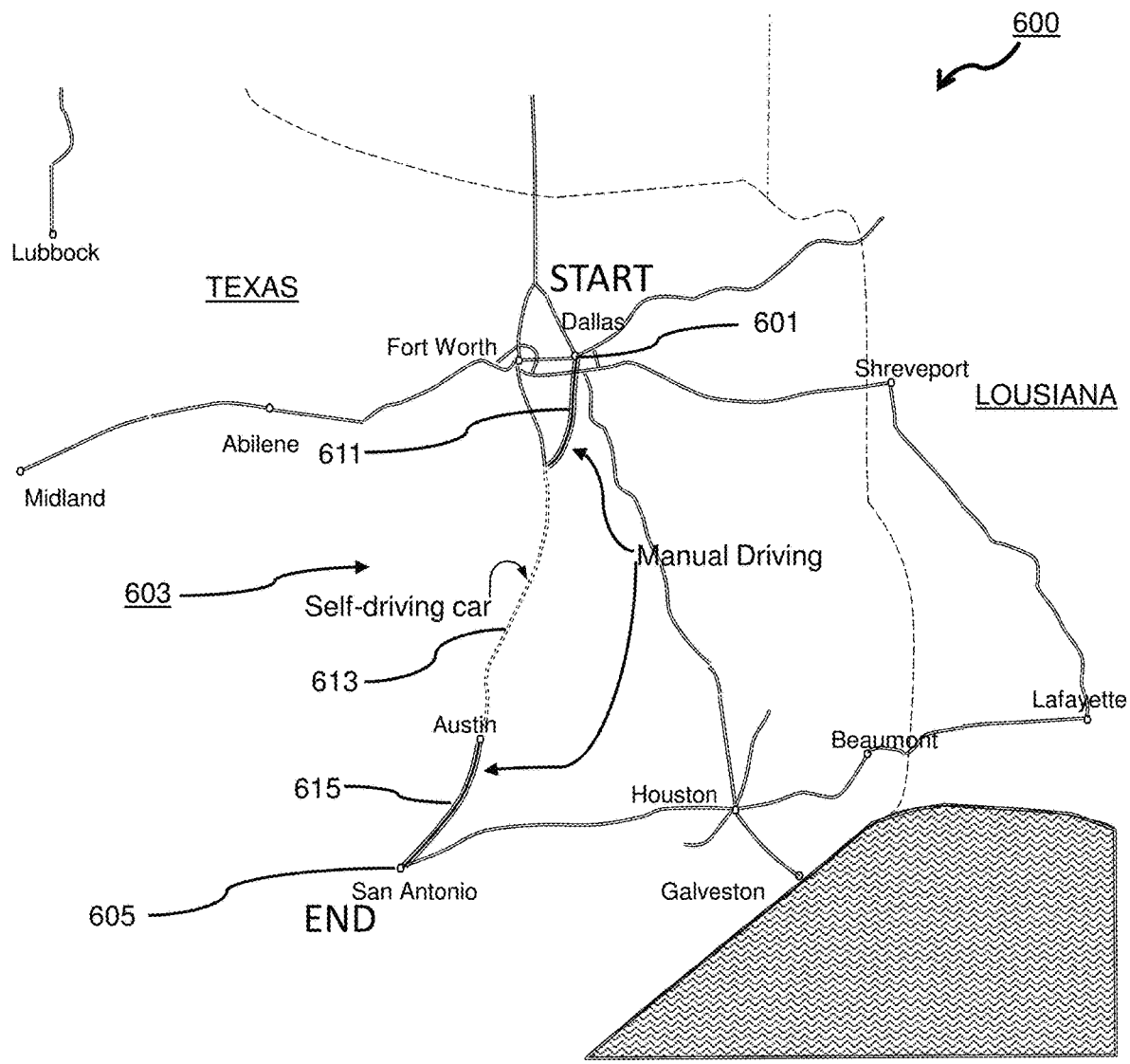
FIG. 6 shows an example of an association of a segmented travel route with user preferences of a sportive or sport driver according to an embodiment.

FIG. 6 shows an example of a regional overview 600 of an association 603 of a segmented travel route with user preferences of a sportive driver according to an embodiment.

The segments of the travel route between are determined based on the findings as described with reference to FIG. 4 and FIG. 5.

In the afore described measurements, segment 611 and segment 615 may be found to be driven manually by a large number of drivers regarding themselves as sport drivers, whereas segment 613 may be found to be driven autonomously or at least semi-autonomously by the same sport drivers.

For example, the sport driver might find the segments 611 and 615 challenging so that he would not miss to drive these segments by himself, whereas he might find segment 613 merely boring, so that he may be prone to let the car drive autonomously or, at least, semi-autonomously.

The choices of the respective drivers to drive manually or to drive autonomously or at least semi-autonomously may be stored in the user's choices database 218 of FIG. 2.

The user's profiles, e.g., sport driver or novice driver, etc., may be stored in the user's profile database 214 of FIG. 2. The breakdown of the routes, i.e., the segmentation of the roads, may be stored in the routes breakdown database 216 of FIG. 2 and the correspondent consolidated statistics may be stored in the consolidated statistics database 212 of FIG. 2.

After having determined and stored these findings in the respective databases, the server backend 200 is able to support a driver assistance apparatus, when having asked for a travel route between START and END, by providing the driver assistance apparatus with information for indicating as to whether drive manually or autonomously or at least semi-autonomously.

Figure 7:
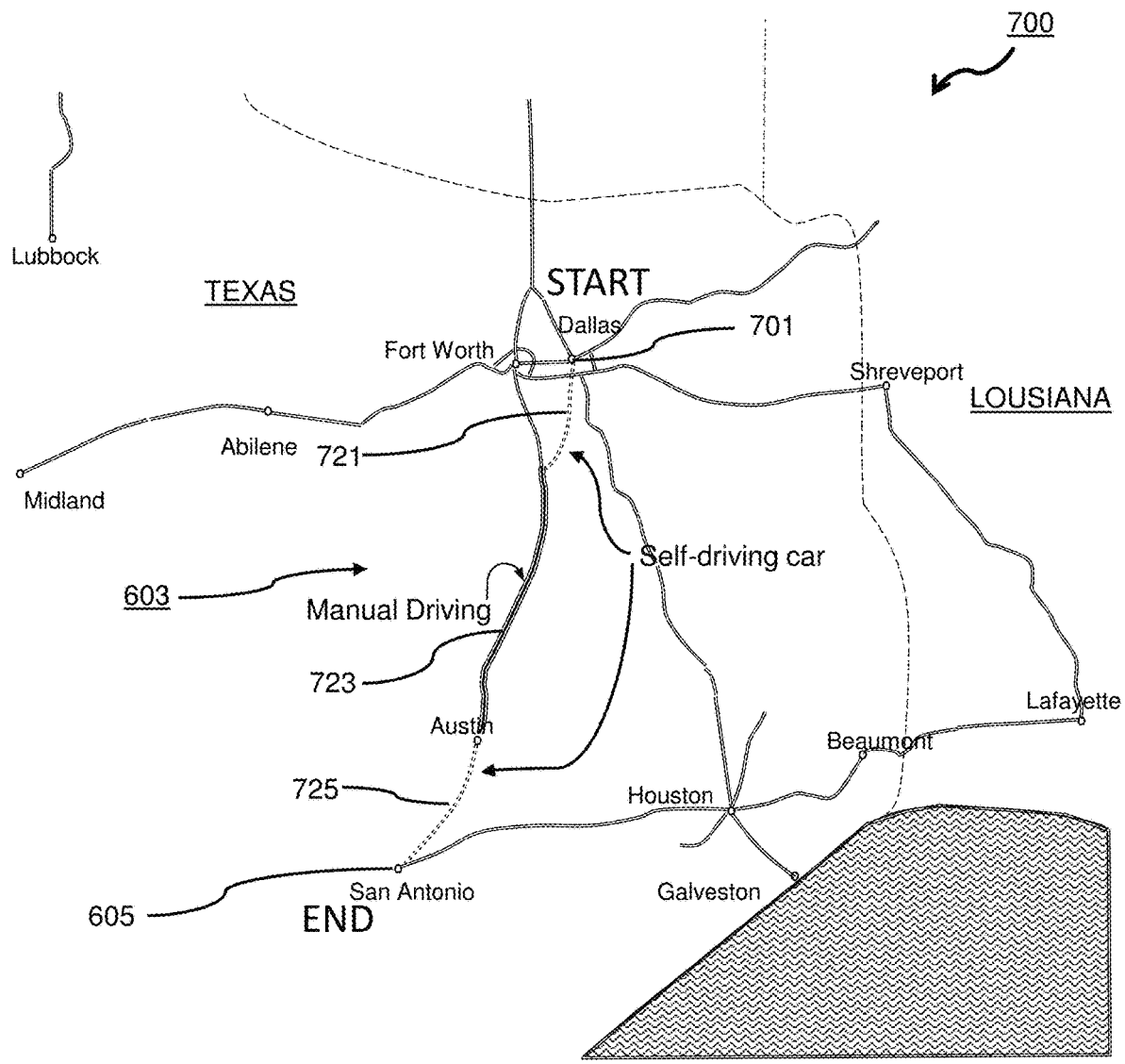
FIG. 7 shows an example of an association of a segmented travel route with user preferences of a novice driver according to an embodiment.

FIG. 7 shows an example of a regional overview 700 of an association 703 of a segmented travel route with user preferences of a novice driver according to an embodiment. Reference signs similar to those of FIG. 6 are intended to have the same meaning.

A road segment 721 may be geographically identical to the road segment 611 of FIG. 6, a road segment 723 may be geographically identical to the road segment 613 of FIG. 6, and a road segment 725 may be geographical identical to the road segment 615 of FIG. 6, however being associated with opposite switching indications.

As the novice driver might regard the segments 611 (721) and 615 (725) too challenging to drive thereon by himself and appreciates an indication not to drive thereon, i.e., an indication by the driver assistance apparatus to let the car drive autonomously or at least semi-autonomously. On the other hand, the novice driver might enjoy practicing on an easy-to-drive segment 723 of the travel route and, thus, appreciate a corresponding indication of the driver assistance apparatus.

Figure 8:
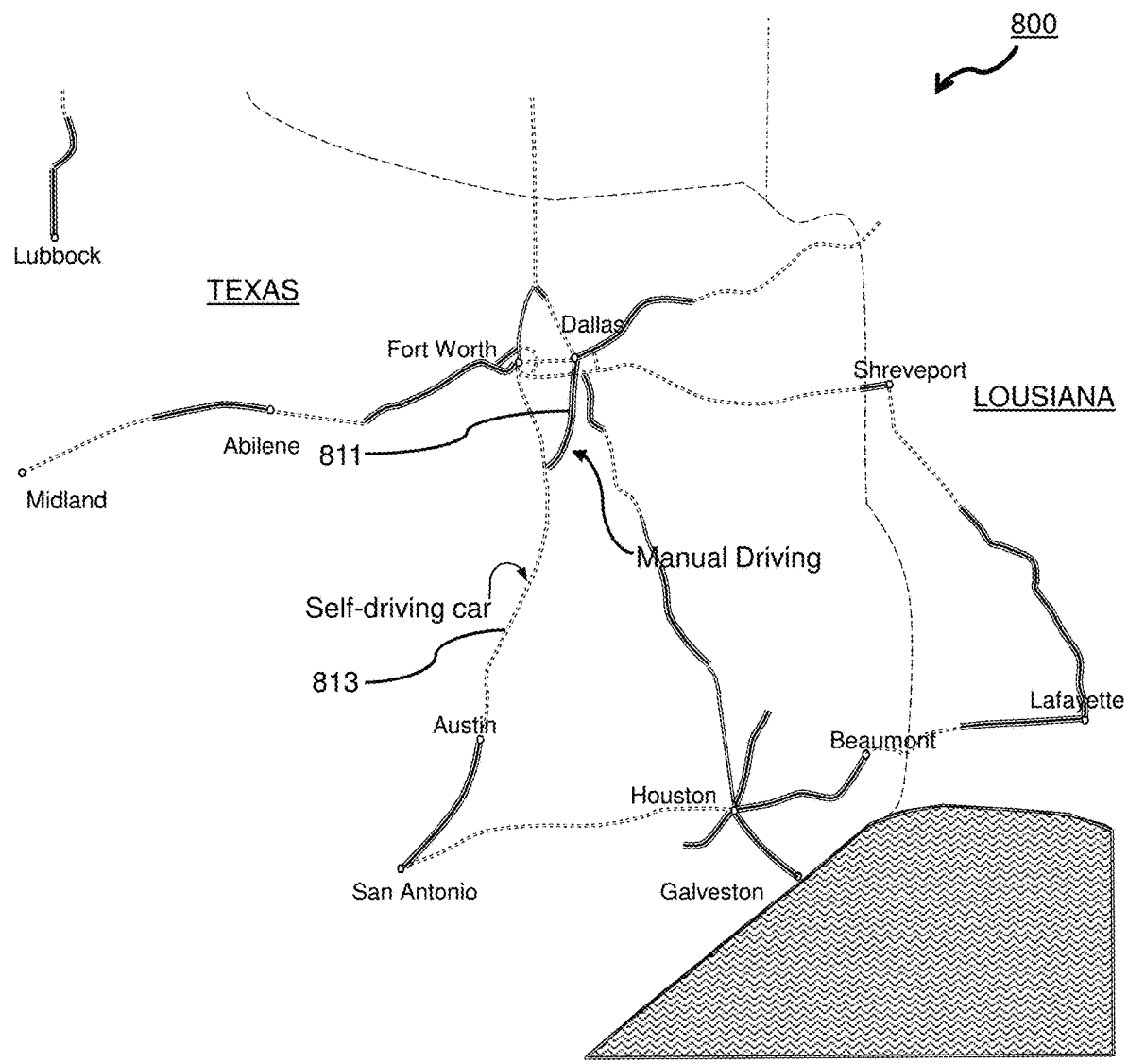
FIG. 8 shows an example of a map of a region with markings of all segments of the roads, exemplarily shown only major roads, in the region in association of the complete segmented road network of the region with user preferences of a sportive or sport driver according to an embodiment.

FIG. 8 shows an example of a regional overview 800 of a map of a region with markings of all segments of the roads, exemplarily shown only major roads, in the region in association of the complete segmented road network of the region with user preferences of a sportive driver according to an embodiment.

In other words, not segments of a distinctive travel route from a start point A to a destination B are shown with recommendation, or, equivalently, indications by the driver assistance apparatus. But merely, all roads of the region 800 are shown to be segmented. In cases, it is considered to have the segmentation be established by a method as explained above with respect to FIGS. 4 and 5. Exemplarily only, this overview map 800 shows segments that would be indicated to be a manually-to-be-driven segment as marked with regard to the segment 811. Whereas segments that would be indicated to be an autonomously or at least semi-autonomously driven segment would be indicated as exemplarily shown at reference sign 813, self-driving car.

Upon having such overview map stored in a database or distributed over the databases shown in FIG. 2 with regard to the server 201, for each driving style, for each road segment of candidate travel route segments, would enable a quick response of the server 201 upon a query of a client 207, or, driver assistance apparatus 1 of FIG. 1.

Figure 9:
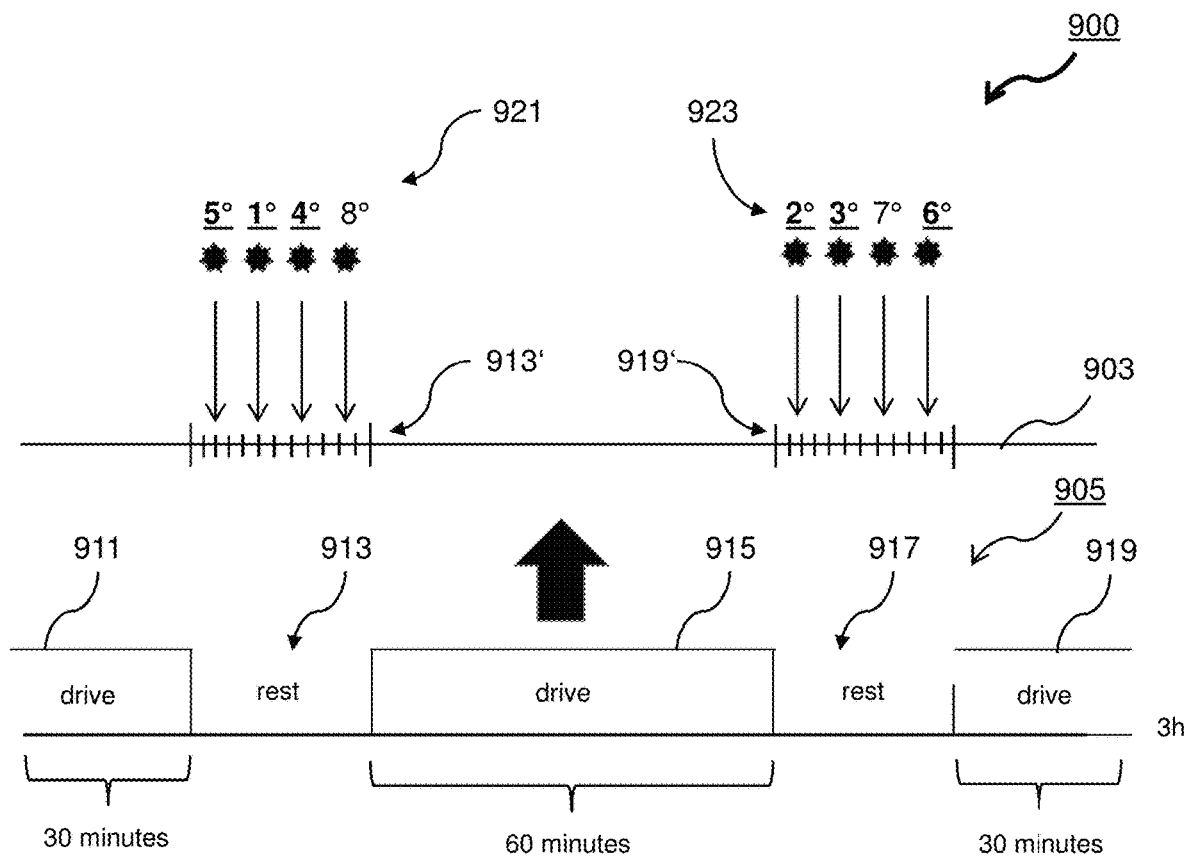
FIG. 9 shows an example of partitioning a travel route according to segments and user preferences according to an embodiment.

FIG. 9 shows an example of partitioning a travel route according to segments and user preferences according to an embodiment.

A user or driver might intend to travel a route that might be determined to take a duration of three hours. The driver might not be willing to drive more than two hours. The driver might be associated with a touristic preference profile, i.e., a driver who enjoys to rest and let the car drive at least semi-autonomously while passing interesting, impressive or beautiful scenery.

Thus, the driver assistance apparatus 1 might select, on its own or based on querying a server 201, a ranking 931 of scenic spots, etc.

Figure 10:
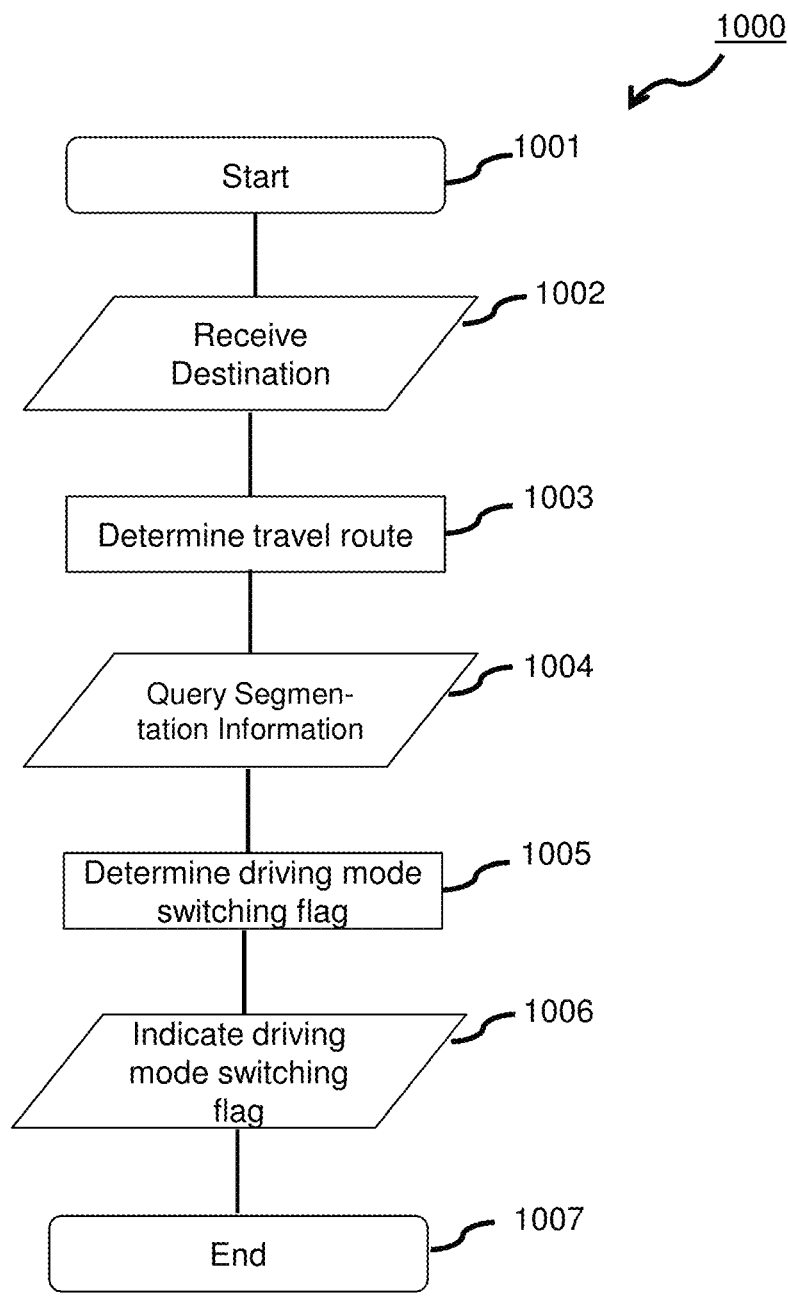
FIG. 10 shows an example of a method for operating a driver assistance apparatus according to an embodiment.

FIG. 10 shows an example of a method for operating a driver assistance apparatus according to an embodiment. A method for operating a driver assistance apparatus 1000 may be described as follows: The driver assistance apparatus may be provided as driver assistance apparatus 1 and be able to drive the vehicle at least semi-autonomously, or, alternatively, let the driver manually drive the vehicle. In other words, the driver assistance apparatus may be adapted to operate a vehicle either in a manual driving mode or in an at least semi-autonomous driving mode.

The method may comprise: receiving 1002 a destination location; determining 1003 at least one travel route to be followed to reach the destination location; querying 1004, e.g. from a server, e.g. from a server 201, segmentation information defining the at least one travel route, the segmentation information comprising at least one segment of the at least one travel route and a segment attribute associated with the at least one segment. In step 1005, it may be determined, which may be performed by the server or the client or by a cooperation of both, for the at least one segment, based at least on the segment attribute and an attribute information entered by a user, a driving mode switching flag. The user may be a driver or driver assisting person or candidate driver. The term candidate driver is intended to mean a person that is only planning the route and, thus, trying several alternatives of travel routes, before actually starting the vehicle. Such flag may be a piece of data, e.g. a byte, that is internal to the driver assistance apparatus computer.

In step 1006 the driving mode switching flag may be indicated to the user, for example, as a flashing light at the control panel or the touch pad screen of the driver assistance apparatus. As is described above, the driving mode switching flag may be an internal representation of a driving mode decision support or a driving mode decision suggestion or recommendation.

The method ends at step 1007.

Figure 11:
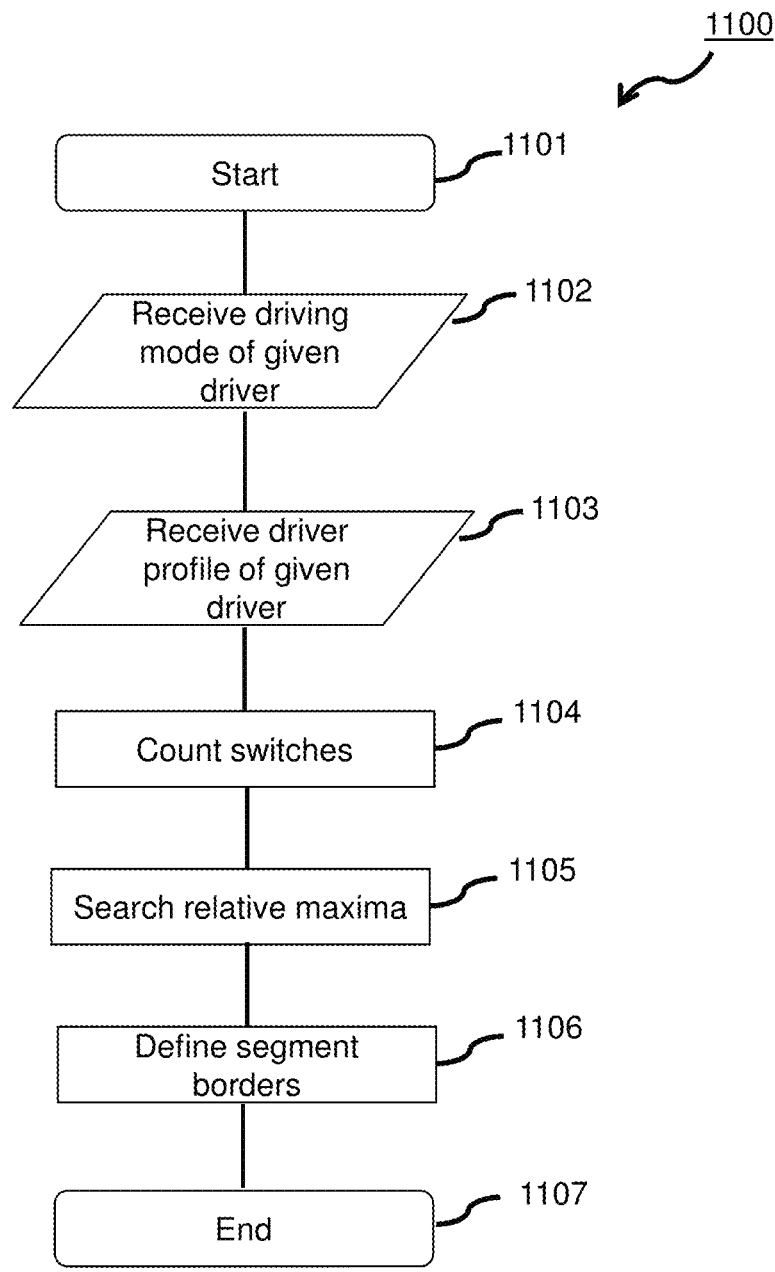
FIG. 11 shows an example of a method for segmenting a given travel route according to an embodiment.

FIG. 11 shows an example of a method for segmenting a given travel route according to an embodiment.

A method 1100 for segmenting a given travel route to obtain segmentation information defining the travel route may be described as follows:

In step 1102 a driving mode of a driver driving along the travel route may be received, wherein the driving mode may be indicative of the driver driving manually or at least semi-autonomously. This information is checked and documented automatically by querying the driver assistance apparatus as to whether manual driving is switched on or off by the driver.

In step 1103, a driver profile or a driver preference may be received or obtained. The driver profile may indicate the driving style of the driver. For example, the driver might assess himself to be a sportive driver, a novice driver, or merely a sightseeing driver, or similar.

In step 1104, according to the method, with regard to a specific actual location, the switches of the driver switching from driving manually to at least semi-autonomously and the driver switching from at least driving semi-autonomously to driving manually are counted. A prerequisite is, of course, that the method is applied to more than one driver driving said route.

In step 1105, it may be searched for all relative maxima of the counted switches of the travel route. In step 1106, segment borders of the travel route at the geographical locations of the relative maxima may be defined, based on the geographical locations of the relative maxima found in step 1105, thus obtaining segmentation information of the given travel route, the segmentation information thus defining the given travel route.

The method 1100 might be repeated a statistically relevant large number of times with a statistically relevant large number of drivers, in order to gain statistically useful and reliable data for providing a segmentation of routes.

Figure 12:
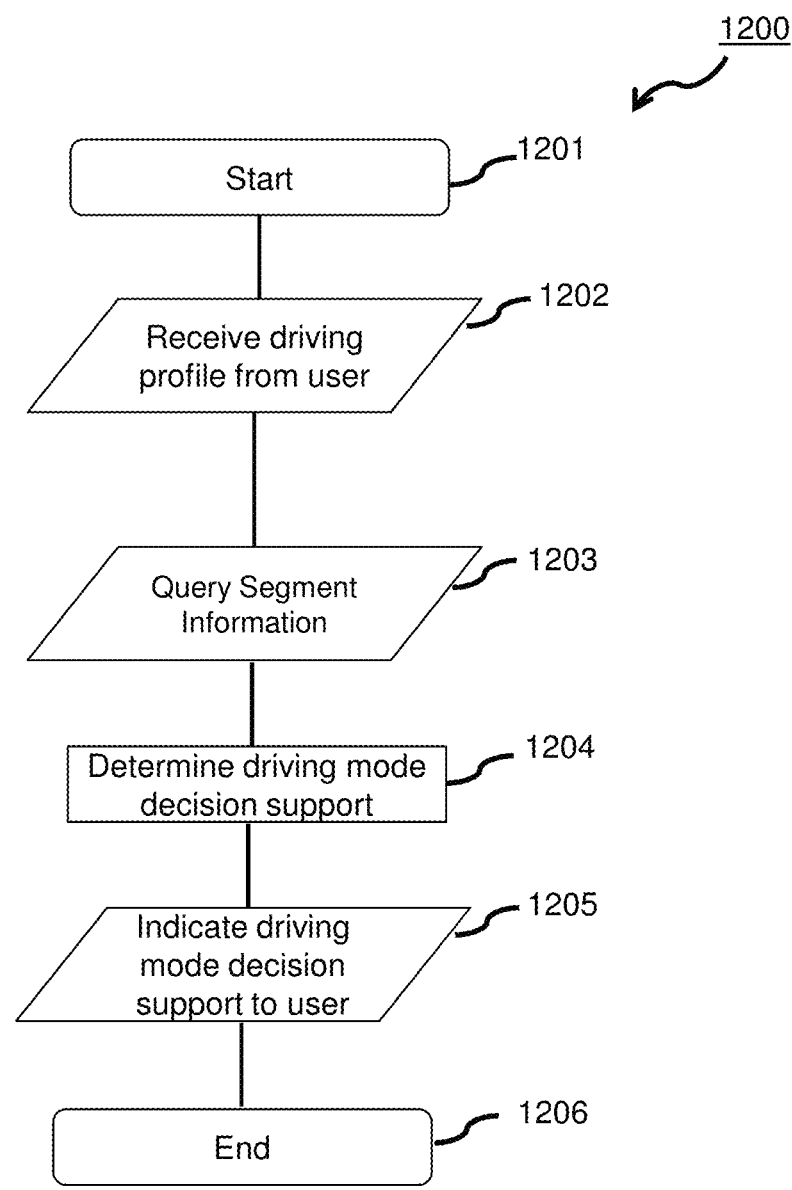
FIG. 12 shows an example of a method for providing a driving mode decision support according to an embodiment.

FIG. 12 shows an example of a method for providing a driving mode decision support according to an embodiment.

The method starts at step 1201. Step 1202 specifies that a driving profile from a user may be received, for example, the user enters his driving profile, e.g. via a user interface, into a computer apparatus executing this method.

In a step 1203, segment information may be queried, the segment information defining at least one road segment. The segment information may comprise at least a model driver driving profile associated with the at least one road segment.

In step 1204, the driving mode decision support may be determined for the at least one road segment, based on the user driver driving profile and the model driver driving profile.

In step 1205, the driving mode decision support, internally represented as driving mode switching flag, may be indicated to the user.

In step 1206, the method ends.

As an example, a rule table of driving mode recommendations may be represented below:

TABLE

| Segment attribute | User attribute | Driving mode switching indicator or driving mode recommendation |
|---|---|---|
| sportive | sportive | DRIVE_MANUAL! |
| sportive | novice | DRIVE_AUTONOMOUSLY! |
| novice | novice | DRIVE_MANUAL! |
| novice | sportive | DRIVE_AUTONOMOUSLY! |
| touristic | touristic | DRIVE_AUTONOMOUSLY! |

For example, when, for a given road segment, the segment is to be found, from the driver assistance server, to be associated to a sport driver, and the actual user is also a sport driver, then, as recommended driving mode might be indicated, "DRIVE_MANUAL", i.e., the recommendation or the decision support, to select manual driving.

In case the same road segment is considered by a user who has entered himself to be a novice driver, as recommended driving mode might be indicated "DRIVE_AUTONOMOUSLY", because it may be highly improbable that a novice driver would enjoy a road segment that has the attribute of being a sportive road segment or a road segment preferred to be driven manually by experienced sportive drivers.

If, for example, the actual user is a sportive user and the road segmented is regarded as a segment for novice drivers, the sportive user might get bored when driving manually, thus, the recommendation would be to drive autonomously.

In case a touristic user is driving on a road segmented attributed to be a touristic road segment, the recommendation will be to drive autonomously, so that the user can enjoy the environment.

In this example, one benefit of the present disclosure comes clear, in that objective information prepared by multiple past drivers concerning a road segment is applied to an individual actual user.

What is claimed is:

1. A method for providing graphically a driving mode decision support to a user of an autonomous vehicle for a decision to select a driving mode of driving on a geographic road segment of a plurality of geographic road segments in a geographic region and graphically indicate to the user respective driving mode decision support for each geographic road segment in the geographic region, the method comprising:
   receiving a driver driving profile of a user;
   querying segment information defining the at least one geographic road segment of the geographical region of a plurality of geographic road segments, the segment information including at least a model driver driving profile associated with each road segment in the geographical region;
   determining, for the plurality of geographic road segments in the geographic region, based on the driver driving profile of the user and the model driver driving profile, a driving mode decision support for the user for the plurality of geographic road segments; and
   providing an indication graphically of the driving mode decision support to the user, the driving mode decision support including a recommended driving mode of driving on the at least one geographic road segment in the geographic region and indicating graphically respective driving mode decision support for each geographic road segment in the geographic region to the user.

2. The method of claim 1, wherein querying the segment information comprises querying a service for providing at least one model driver driving profile associated with the at least one road segment in the geographic region.

3. The method of claim 1, wherein the model driver driving profile is based on evaluated statistical data of measured driver behavior.

4. The method of claim 1, wherein the segment information further comprises at least one identifier for geographically identifying the at least one geographic road segment on a road in the geographic region.

5. The method of claim 1, wherein the segment information further comprises a model driver driving mode decision.

6. The method of claim 5, wherein the model driver driving mode decision is one of at least driving manually, driving semi-autonomously, or driving fully-autonomously.

7. The method of claim 1, wherein the driving mode decision support is one of at least driving manually, driving semi-autonomously, or driving fully-autonomously.

8. The method of claim 1, wherein a driving mode decision support of driving semi-autonomously comprises at least one degree of driving semi-autonomously.

9. The method of claim 1, further comprising receiving a destination location.

10. The method of claim 9, further comprising determining at least one travel route to be followed to reach the destination location, the travel route comprising a route segment.

11. The method of claim 1, wherein graphically indicating the driving mode decision support comprises distinguishably indicating the respective driving mode decision support.

12. The method of claim 1, wherein a driving profile of the user comprises at least a preferred driving style, and, for each type of road segment in the geographic region a preferred switching suggestion indicating a preferred driving mode decision.

13. The method of claim 1, wherein the determining the driving mode decision support comprises querying a table of rules, wherein the table of rules comprises at least a model driver driving profile and a user driver driving profile as independent fields and a driving mode decision support as a dependent field.

14. The method of claim 1, further comprising prompting the user via a driver assistance apparatus to enter a decision of the user via an interface.

15. A driver assistance component for providing graphically a driving mode decision support to a user of an autonomous vehicle for a decision to select a driving mode of driving on at least one road segment of a plurality of geographic road segments in a geographic region and graphically indicate to the user respective driving mode decision support for each geographic road segment in the geographic region, the driver assistance component being adapted to:
   receive a driver driving profile of a user;
   query segment information defining the at least one geographic road segment of the geographical region of a plurality of geographic road segments, the segment information comprising at least a model driver driving profile associated with each road segment in the geographical region;
   determine, for the plurality of geographic road segments in the geographic region, based on the user driver driving profile and the model driver driving profile, the driving mode decision support for the plurality of geographic road segments; and
   indicate graphically the driving mode decision support to the user, the driving mode decision support including a recommended driving mode of driving on the at least one road segment in the geographic region and indicating graphically respective driving mode decision support for each geographic road segment in the geographic region to the user.

16. The driver assistance component of claim 15, further comprising:
   an interface to receive the driver driving profile of the user;
   an interface to receive the segment information;
   a computing unit, comprising at least a processor, memory and a bus to determine the driving mode decision support; and
   an interface to output graphically at least the driving mode decision support indication to the user.

17. The driver assistance component of claim 16, wherein the interface to receive the driver driving profile of the user and the interface to output graphically the driving mode decision support indication to the user is a touchpad.

18. The driver assistance component of claim 15, wherein the driver assistance component is at least one of a smartphone, a tablet computer, or a tablet computer.

19. A computer program product for providing a driving mode decision support to a user of an autonomous vehicle for a decision to select a driving mode of driving on a road segment of a plurality of geographic road segments in a geographic region and graphically indicate to the user respective driving mode decision support for each geographic road segment in the geographic region, the computer program product comprising:
- a computer readable storage medium having computer usable code embodied therewith, wherein the computer readable storage medium is not a transitory signal per se, the computer usable program code executable by a least one processor to perform:
- receiving a driver driving profile of a user;
- querying segment information defining the geographic road segment of the geographical region of a plurality of geographic road segments in the geographic region, the segment information comprising at least a model driver driving profile associated with each segment in the geographical region;
- determining, for the plurality of geographic road segments in the geographic region, based on the driver driving profile of the user and the model driver driving profile, the driving mode decision support for the plurality of geographic road segments; and
- indicating graphically the driving mode decision support to the user, the driving mode decision support including a recommended driving mode of driving on the at least one road segment in the geographic region and indicating graphically respective driving mode decision support for each geographic road segment in the geographic region to the user.

* * * * *